US012635689B2

(12) United States Patent
Steinberg et al.

(10) Patent No.: US 12,635,689 B2
(45) Date of Patent: May 26, 2026

(54) ANTIFUNGAL COMPOSITIONS

(71) Applicant: University of Exeter, Exeter (GB)

(72) Inventors: Gero Steinberg, Exeter (GB); Sarah Gurr, Exeter (GB); Mark Wood, Exeter (GB)

(73) Assignee: University of Exeter, Exeter (GB)

( * ) Notice: Subject to any disclaimer, the term of this patent is extended or adjusted under 35 U.S.C. 154(b) by 945 days.

(21) Appl. No.: 17/600,678

(22) PCT Filed: Mar. 18, 2020

(86) PCT No.: PCT/GB2020/050691

§ 371 (c)(1),
(2) Date: Oct. 1, 2021

(87) PCT Pub. No.: WO2020/201698

PCT Pub. Date: Oct. 8, 2020

(65) Prior Publication Data

US 2022/0174950 A1 Jun. 9, 2022

(30) Foreign Application Priority Data

Apr. 4, 2019 (GB) ...................................... 1904744

(51) Int. Cl.

| | |
|---|---|
| ***A01N 33/12*** | (2006.01) |
| ***A01N 25/04*** | (2006.01) |
| ***A01N 31/02*** | (2006.01) |
| ***A01P 3/00*** | (2006.01) |

(52) U.S. Cl.

CPC ............. *A01N 33/12* (2013.01); *A01N 25/04* (2013.01); *A01N 31/02* (2013.01); *A01P 3/00* (2021.08)

(58) Field of Classification Search

CPC ...................................................... A01N 33/12

See application file for complete search history.

(56) References Cited

U.S. PATENT DOCUMENTS

| | | | | |
|---|---|---|---|---|
| 4,088,781 | A * | 5/1978 | Tozzolino | C07C 381/12 514/706 |
| 4,542,023 | A | 9/1985 | Lacroix et al. | |
| 2006/0025458 | A1 | 2/2006 | Mamoun | |

FOREIGN PATENT DOCUMENTS

| | | | |
|---|---|---|---|
| CN | 100518517 | C | 7/2009 |
| CN | 105076133 | A | 11/2015 |
| CN | 109504511 | A | 3/2019 |
| EP | 0064441 | A1 | 11/1982 |
| EP | 0079972 | A1 | 6/1983 |
| FR | 810437 | A | 3/1937 |
| JP | S59141557 | A | 8/1984 |
| JP | S59212498 | A | 12/1984 |
| JP | H09300820 | A | 11/1997 |
| JP | 2008044881 | A | 2/2008 |
| JP | 2011032212 | A | 2/2011 |
| JP | 6096396 | B1 * | 3/2017 |
| WO | 9115120 | A1 | 10/1991 |

OTHER PUBLICATIONS

Negoro, K., et al., "Preparation of alkyl etmhylmethyl sulfonium iodide and their physico-chemical, antimicrobial properties", J Japan Oil Chemists' Society, vol. 27, No. 1, Jan. 1978, p. 47-51, full translation. (Year: 1978).*

Negoro, Kenji , et al., "Preparation of Alkyl ethylmethyl sulfonium lodide and Their Physico-chemical, Antimicrobial Properties", Journal of Japan Oil Chemists' Society, vol. 27, No. 1,Jan. 1, 1978 (Jan. 1, 1978), pp. 47-51, XP055696558, DOI: 10 . 5650/j os 1956 . 27 . 47 abstract table 2 p. 50; table 5.

Yamauchi, Kiyoshi , et al., "Three-Phase Model of Micellar Reactions. Methylation of Thymidine by (Long-chain-alkyl)dimethyl sulfonium Iodides1", J. Am. Chem. Soc, vol. 105, Feb. 1, 1983 (Feb. 1, 1983), pp. 538-545, XP055690018,DOI: 10. 1021/jaO0341a039, p. 538; table 1.

Young, et al., "Inhibition of the Clostridium perfringens Phospholipase C Hydrolysis of a Thiophosphate Analog of Lysophosphatidylcholine by Micelle-Bound Ammonium and Sulfonium Cations", Lipids, Springer-Verlag, Berlin/Heidelberg, vol. 26, No. 11, Nov. 1, 1991 (Nov. 1, 1991), pp. 957-959, XP035174040, Issn: 1558-9307, DOI: 10.1007/BF02535984.

Hirayama, Michiasa, "The Antimicrobial Activity, Hydrophobicity and Toxicity of Tri(n-Alkyl) sulfoniums and Tris(n- Alkylphenyl) sulfoniums, and Their Relationships", Biocontrol Science, 2011, vol. 16, No. 4, 149-158,.

Hirayama, Michiasa, "The Antimicrobial Activity, Toxicity and Antimicrobial Mechanism of a New Type of Tris (alkylphenyl) sulfonium", Biocontrol Science, 2012, vol. 17, No. 1, 27-35,.

* cited by examiner

*Primary Examiner* — Gina C Justice

(74) *Attorney, Agent, or Firm* — Servilla Whitney LLC

(57) ABSTRACT

The invention provides an antifungal composition comprising an antifungal compound of formula R—$S^+(R')_2$ or R—$N^+(R')_3$ wherein R is C17-C32 straight chain or branched alkyl; and each R' is independently methyl, ethyl, propyl, isopropyl or butyl; and uses of said composition as antifungal agents.

2 Claims, 9 Drawing Sheets

Table 1. Anti-fungal activity and toxicity of SACCs

| | $C_{12}$-$G^+$ | $C_{18}$-$TMA^+$ | $C_{18}$-$DMS^+$ |
|---|---|---|---|
| **1.Toxicity in *Z. tritici*** | | | |
| Fragmentation of mitochondria* | 6.64 | 1.55 | 1.72 |
| Inhibition of respiration* | 0.32 | 0.14 | 0.25 |
| Cell mortality** | 32.29 | 89.27 | 66.47 |
| **2. Toxicity in human cells** | | | |
| Fragmentation of mitochondria* | 33.10 | 44.5 | 50.00 |
| Inhibition of respiration* | 16.10 | 10.50 | 13.35 |
| Relative Toxicity£ | 50.31 | 75 | 53.4 |
| **3. Toxicity in zooplankton** | | | |
| Mortality of *Daphnia magna*§ | 0.41 | 2.01 | 3.63 |
| Relative toxicity+ | 13.23 | 179.43 | 241.29 |
| **4. Toxicity in plants¶** | | | |
| Leaf symptoms in wheat | >1000 | >1000 | >1000 |
| Leaf symptoms in rice | >1000 | >1000 | >1000 |
| **4. Anti-fungal protection** | | | |
| Protection against Septoria leaf blotch$ | 5.00 | 1.57 | 0.22 |
| Protection against rice blast disease‖ | 17.19 | 12.45 | 2.67 |
| Induction of plant defense& | 14.4 | 6.2 | 64.9 |

*Estimated concentration (µg/ml) at 50% effect ($EC_{50}$) after 30-45 min treatment.
**Percentage of dead *Z. tritici* cells in liquid cultures after 25h incubation at 10 µg/ml.
£Quotient of $EC_{50}$ values for inhibition of human respiration and fungal respiration.
§Estimated concentration (µg/ml) at 50% immobile/non-responsive water fleas after 24h.
+Mortality in *Z. tritici* multiplied by mortality in *Daphnia*, indicates toxicity at same effectiveness.
¶Lowest concentration (µg/ml) at which chlorosis occurs after 7d incubation.
$Mean leaf area with pycnidia (%); 21d old wheat, sprayed at 100 µg/ml and infected after 24h.
‖Mean lesion area (%); 4d old rice leaves, sprayed at 125 µg/ml and infected 24h later.
&DAB-stained leaf area after 6h treatment with 150 µg/ml, given as percent of positive control.

Figure 1

Table 2. Comparison of $C_{18}$-$DMS^{+}$ and dodine

| | Fold-change |
|---|---|
| **1. Toxicity in *Z. tritici*** | |
| Fragmentation of mitochondria | **+3.9** |
| Inhibition of respiration | **+1.3** |
| Cell mortality | **+2.1** |
| **2. Toxicity in human cells** | |
| Fragmentation of mitochondria | **+1.5** |
| Inhibition of respiration* | -1.21 |
| Relative toxicity | **+1.06** |
| **3. Toxicity in zooplankton** | |
| Mortality of *Daphnia magna* | **+8.9** |
| Relative toxicity | **+18.2** |
| **4. Toxicity in plants** | |
| Leaf symptoms in wheat | No change |
| Leaf symptoms in rice | No change |
| **5. Anti-fungal protection in** | |
| Against Septoria leaf blotch | **+22.7** |
| Against rice blast disease | **+6.6** |
| Induction of plant defence | **+4.5** |

All values indicate a fold-change in anti-fungal performance or toxicity of C18-DMS+ compared to C12-G+; values are based on data summarised in Table 1; improved performance is indicated in by "+" and highlighted in bold; decreased performance is indicated by "-"; a value of 1 indicates identical performance.

Figure 8

ANTIFUNGAL COMPOSITIONS

CROSS-REFERENCE TO RELATED APPLICATIONS

This application is the National Stage entry of PCT/GB2020/050691, filed on Mar. 18, 2020, which claims priority to GB Application Serial No. 1904744.8 filed Apr. 4, 2019, the entire disclosures of which are hereby incorporated by reference herein.

TECHNICAL FIELD OF THE INVENTION

This invention relates to antifungal compositions comprising single alkyl chain cationic antifungal compounds. The invention further relates to use of single alkyl chain cationic compounds as antifungal agents. In particular the invention relates to antifungal compositions, methods and uses.

BACKGROUND TO THE INVENTION

Fungi pose one of the greatest biotic challenges to crop plant health and thus to food security. This threat is compounded by intensive farming practices, such as monoculture cropping—where vast fields of genetically-uniform cultivars provide an ideal environment for the generation of new fungicide resistant strains. Indeed, the rate of emergence of fungicide resistance outpaces the rate of antifungal discovery. There are only a handful of "new" antifungals in the "pipeline" but these are derivatives of commonly-used chemistries, such as those which target ergosterol biosynthesis or particular complexes of the mitochondrial respiration chain. There is clearly an immediate need for novel antifungals with new modes of action, low mammalian toxicity and which are environmentally benign. Moreover, there is a growing need for the discovery of new antifungals to better protect animals (including humans) from fungal disease. This is set against the background of emerging antifungal resistance to currently used clinical drugs (azoles). It is also desirable for azoles to be replaced as a preservative treatment in wall paints and treated timber.

One potential target of new fungicides are fungal mitochondria. These organelles are involved in a broad range of cellular processes, but most importantly host the enzymes for oxidative phosphorylation, which provides the chemical energy to "fuel" the cell. Oxidative phosphorylation depends on electron transfer through the mitochondrial respiration chain complexes in the inner mitochondrial membrane (Hirst, 2013). Fungal mitochondria differ from their mammalian counterpart in the composition and function of respiratory enzymes, which makes them attractive targets for new fungicides. Indeed, two of the three market leader single-target site fungicides, that is the succinate dehydrogenase inhibitors (SDHIs) and the strobilurins, disrupt the fungal mitochondrial respiration chain, targeting respiratory complexes II and III. Mitochondria also produce reactive oxygen species (mROS) at complex I and III, which, if deregulated, can damage proteins and lipids in the inner mitochondrial membrane, and trigger apoptotic cell death. Increasing evidence suggests that such a programmed cell death pathway exists in fungi and targeting this pathway is a promising strategy to develop novel antifungals.

Electron-transfer through the respiration chain triggers proton transport across the inner mitochondrial membrane. This leaves the matrix negatively charged and, as such, it becomes a target for lipophilic cations. These molecules, which combine a cationic head group with a lipophilic moiety pass through cellular membranes and accumulate in the inner membrane of the mitochondrion and expose their cationic moiety towards the matrix. This behaviour allows delivery of therapeutics into mitochondria, but can also inhibit the respiratory enzymes. Whilst such effect on mitochondria function challenges use of lipophilic cations in medicine, it could be key for the use of lipophilic cations as plant fungicides/antifungals.

Lipophilic cations are widely-used as "cationic surfactants" disinfectants or as supplements in cosmetics and pharmaceutical formulations. Cationic surfactants, and, in particular, quaternary ammonium compounds, are recognised for their anti-bacterial activity, but recently gained increasing attention due to their potential use in controlling human pathogenic fungi. The term cationic surfactant implies that these compounds exert their biocidal activity on the surface of the pathogen. Indeed, due to their amphiphilic structure, these molecules are expected to insert into the plasma membrane—and all antifungal lipophilic n-alkyl chain cations known to-date appear to kill fungal cells by altering permeability or function of the plasma membrane or by interacting with the fungal cell wall. This includes the lipophilic single alkyl chain cation (SACC) dodecylguanidinium (hereafter named "C12-G+"), which is the active ingredient of the fungicide dodine. Dodine is a protectant fungicide that is widely-used to control fruit scab and foliar diseases in orchards. While C12-G+ is thought to permeabilise fungal cells, it also enters the cell and was reported to inhibit vital metabolic enzymes. Whether the intracellular activity is the primary mode of action of C12-G+ or a consequence of cell leakage due to increased cell permeability is not known.

While C12-G+ is useful as a fungicide, it has some issues with toxicity. In particular the toxicity of C12-G+ to *Daphnia magna* (water fleas) and so may cause environmental problems if it is used as a fungicide on crops or soil as this may result in water run-off to bodies of water such as lakes and rivers, for example.

In addition, although C12-G+ is useful as a fungicide, its efficacy is limited when used against certain fungi. For example, when used to suppress *Zymoseptoria tritici* or *Magnaporthe oryzae* on wheat and rice respectively, C12-G+, whilst nominally effective, does not fully suppress resultant *Septoria* wheat blotch and rice blast disease, even at nominally high concentrations (75 μl/ml-100 μl/ml C12-G+).

There is a continuing need for more effective treatments against crop pathogens to secure our future food production. The rapid development of fungicide resistance in market-leader chemistries makes identification of new fungicides a priority. These fungicides should (i) be active against crop-destroying pathogens, (ii) target a fundamental process at multiple sites to reduce resistance development (iii) be of low toxicity to humans and the environment.

It would therefore be advantageous to provide further cationic surfactant-based antifungal compounds, which improve upon the efficacy of known cationic surfactant-based antifungal compounds such as C12-G+, against specific fungi or against a wide range of fungi. The term "antifungal" as used herein, refers to broad spectrum toxicity effects against members of all fungal phyla and oomycetes.

It would also be advantageous to provide further cationic surfactant-based antifungal compounds with reduced environmental and/or human toxicity and paint preservation and to prevent decay in felled timber products.

It would furthermore be advantageous to provide more effective cationic surfactant-based antifungal compounds, compositions and treatments which target the metabolism of fungi at multiple sites in one or more metabolic pathways. Such fungicides would ideally employ a novel multi-site mode of action, which targets fundamental processes in the pathogenic cell.

In addition, it would be advantageous to provide effective cationic surfactant-based biocidal compounds which are effective against human and/or animal pathogens, such as pathogenic fungi, as well as being effective against plant pathogens.

It is therefore an aim of embodiments of the present invention to overcome or mitigate at least one problem of the prior art, whether described herein or not.

SUMMARY OF THE INVENTION

According to a first aspect of the invention there is provided a composition comprising an antifungal compound (A) of formula $R—S^+(R')_2$ or $R—N^+(R')_3$ wherein R is C17-C32 straight chain or branched alkyl; and each R' is independently methyl, ethyl, propyl, isopropyl or butyl.

Compound (A) may comprise any suitable counter anion, such as bromide, chloride, iodide, hydroxide, sulfate, hydrogen sulfate and phosphate.

The composition is preferably an antifungal composition but may also be an antibacterial, or antiarchaeal composition, or any combination thereof (for example an antifungal and antibacterial composition, or an antifungal, antibacterial and antiarchaeal composition).

The invention also provides a pharmaceutical composition comprising a compound (A) and a pharmaceutically acceptable carrier or excipient, use of compound (A) as an antifungal agent, and a method of destroying, controlling or suppressing fungus by contacting compound (A) with said fungus In preferred embodiments R is C18-C24, preferably straight chain alkyl, C18-C22, preferably straight chain alkyl or C18-C20, preferably straight chain alkyl. In especially preferred embodiments R is C18 straight chain alkyl.

In some embodiments at least one R' is methyl or ethyl, and in preferred embodiments all R' are methyl.

Especially useful as compound (A) in the compositions, uses and methods of the invention are C18-dimethyl sulfonium (octadecyldimethylsulfonium or "C18-DMS+") and C18-trimethyl ammonium (octadecyltrimethylammonium or "C18-TMA+") having the respective formulae:

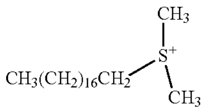 and 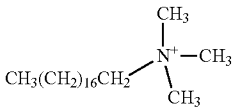

The composition may comprise a solution, suspension, emulsion, powder, paste, granules, gel, mousse or dust, for example.

The composition may include a carrier. The carrier may comprise a solvent, which may be water or an aqueous solvent. Thus, the composition may be an aqueous composition of compound (A) in water, or an aqueous solvent. The aqueous solvent may comprise water and a co-solvent, which may be selected from methanol and ethanol, for example.

The antifungal composition may comprise compound (A) at a concentration of at least 0.1 μg/ml, 0.2 μg/ml, 0.3 μg/ml, 0.4 μg/ml, 0.5 μg/ml, 0.75 μg/ml, 1 μg/ml, 1.5 μg/ml, 2 μg/ml, 2.5 μg/ml, 5 μg/ml, 7.5 μg/ml, 10 μg/ml, 15 μg/ml, 20 μg/ml, 30 μg/ml, 40 μg/ml, 50 μg/ml, 60 μg/ml, 70 μg/ml, 75 μg/ml, at least 100 μg/ml, at least 200 μg/ml, at least 250 μg/ml, at least 500 μg/ml or at least 1000 μg/ml of the composition.

In some embodiments the composition comprises compound (A) at a concentration of between 0.1-1000 μg/ml, such as between 0.1-250 μg/ml, or between 0.1-200 μg/ml.

For some applications, such as application of the composition to crop plants (e.g. wheat, barley, oats, rice, sorghum, plantain, maize, potatoes, vegetables or fruits), horticultural plants, and trees, the composition may comprise compound (A) at a concentration of between 10-1000 μg/ml, such as between 20-500 μg/ml, between 25-250 μg/ml or between 10-100 μg/ml.

In some embodiments the composition may comprise an adjuvant. The adjuvant may enhance the efficacy of the antifungal compound (A). The mechanisms of action of suitable adjuvants include buffering water to a pH at which a specific antifungal compound is most active, water conditioning (for example when using hard water to solvate or dilute the antifungal compound, they may reduce the potential inhibitory effects of minerals such as calcium and magnesium), reducing the surface tension of water ("wetting agents") so that the antifungal composition has greater coverage of surface to which it is applied. Adjuvants may contain solvents which make surfaces (such as leaf cuticles of plants to which the composition is applied, for example) more penetrable to the antifungal compound; or they may contain nutrients which may assist the antifungal compound when applied to crops or other plants, such as to encourage plant growth; or which render compound (A) more efficacious against actively growing plants. Other suitable adjuvants are defoaming agents, adjuvants which reduce drift during spraying of the antifungal compound, and adjuvants which may reduce evaporation and antifungal compound volatility.

The adjuvant may be a compound selected from: a pH buffering agent; a water conditioning agent; a wetting agent; a leaf cuticle and/or cell membrane penetration aid; a plant growth enhancer; a defoaming agent; a spray drift reducing agent; and/or an evaporation reducing agent; or any combination thereof.

The adjuvant may be in the form of a crop protectant spray additive and/or a surfactant. The adjuvant may increase the permeability of plant cuticles and/or cell membranes. The adjuvant may be a non-ionic spreading and a penetration aid; and/or act to reduce surface tension of the composition.

The adjuvant may enhance the fungicidal activity of said compound (A), for example by increasing permeability of cuticles and/or cell membranes. The adjuvant may enhance the fungicidal activity of compound (A), for example by increasing permeability of plant cuticles and/or cell membranes.

The adjuvant may be an additive for crop protectant sprays, such as a surfactant; a non-ionic spreading and a penetration aid; and/or act to reduce surface tension of the composition, for example.

The adjuvant may comprise an activator adjuvant or a utility adjuvant.

Activator adjuvants are compounds that when added to the composition comprising compound (A), enhance the antifungal activity thereof. Activator adjuvants include surfactants, oil carriers such as phytobland (not harmful to plants) oils, crop oils, crop oil concentrates (COCs), vegetable oils, methylated seed oils (MSOs), petroleum oils, and silicone derivatives, as well as nitrogen fertilizers, for example.

Utility adjuvants, which are sometimes called spray modifiers, alter the physical or chemical characteristics of the composition making it easier to apply, such as, for example, by increasing its adherence to plant surface so that it is less likely to roll off, or increasing its persistence in the environment.

One or more oils may be used as an adjuvant carrier or diluent for compound (A).

Salts may also be used as activator adjuvants, such as, for example, to increase the uptake and effect of the antifungal compound in a target surface, material or plant over time.

One or more surfactant adjuvants may be present in the composition to facilitate or enhance the emulsifying, dispersing, spreading, sticking or wetting properties of the composition.

Surfactants reduce surface tension in the spray droplets of the composition, when the composition is applied to a material (such as a surface, plant leaf, etc.), which aids the composition to spread out and cover the target material with a thin film, leading to more effective or quicker absorption of the composition into the material. Surfactants may also affect the absorption of the composition when sprayed on stems or leaves of a plant, by changing the viscosity and crystalline structure of waxes on leaf and stem surfaces, so that they are more easily penetrated by compound (A) of the composition.

The surfactant may be chosen to enhance the antifungal properties of the composition, through any one or more of: a) making the composition spread more uniformly on a material to which the composition is applied; b) increasing retention (or 'sticking') of the composition on the material; c) for plant or crop protection applications, increasing penetration of the composition through hairs, scales, or other leaf surface structures of a plant; d) preventing crystallization of the composition; and/or e) slowing the drying of the composition.

Each surfactant may be selected from a non-ionic surfactant, an ionic surfactant, an amphoteric surfactant or a zwitterionic surfactant, or any combination thereof.

Non-ionic surfactants are generally biodegradable and are compatible with many fertilizers and so may be preferable in compositions of the invention when used in crop or plant protection applications. Some non-ionic surfactants are waxy solids and require the addition of a co-solvent (such as alcohol or glycol) to solubilize into liquids. Glycol co-solvents are generally preferred over alcohols, as the latter are flammable, evaporate quickly, and may increase the number of fine spray droplets (making the formulation likely to drift when sprayed).

The non-ionic surfactant may comprise an organosilicone or silicone surfactant (including siloxanes and organosiloxanes). Organosilicone surfactants significantly reduce surface tension of the composition, enabling the composition, in use, to form a thin layer on a leaf or stem surface of a plant. Silicone surfactants also decrease surface tension and may allow the composition to penetrate the stomates of a plant leaf. Silicone surfactants also provide a protective effect to the compositions of the invention by making the compositions very difficult to wash off after they are applied. Silicone surfactants can also influence the amount/rate of antifungal compound (A) absorption through the cuticle of a leaf.

In other embodiments, the non-ionic surfactant may comprise a carbamide surfactant (also known as a urea surfactant). The carbamide surfactant may comprise monocarbamide dihydrogen sulfate, for example.

Suitable ionic surfactants include cationic surfactants and anionic surfactants. Suitable cationic surfactants include tallow amine ethoxylates. Suitable anionic surfactants include sulfates, carboxylates, and phosphates attached to lipophilic hydrocarbons, including linear alkylbenzene sulfonates, for example.

Amphoteric surfactants contain both a positive and negative charge and typically function similarly to non-ionic surfactants. Suitable amphoteric surfactants include lecithin (phosphatidylcholine) and amidopropylamines, for example.

Utility adjuvants, which are sometimes called spray modifiers, alter the physical or chemical characteristics of the compositions of the invention making the composition easier to apply, which may increase its adherence to a plant surface so that the compositions have a reduced risk of being removed from said surface; or increasing the persistence of the composition in the environment or treatment area in which the composition is present.

Examples of different functional categories of utility adjuvants suitable for use in the compositions and uses of the invention include wetting agents, spreading agents, drift control agents, foaming agents, dyes, thickening agents, deposition agents (stickers), water conditioning agents, humectants, pH buffers, de-foaming agents, anti-foaming agents and UV absorbents. Some utility adjuvants may function in more than one of the aforesaid functional categories. Some activator adjuvants are also utility adjuvants.

Wetting agents or spreading agents lower surface tension in the compositions, and allow the compositions to form a large, thin layer on the leaves and stems of a target plant. Since these agents are typically non-ionic surfactants diluted with water, alcohol, or glycols they may also function as activator adjuvants (surfactants). However, some wetting or spreading agents affect only the physical properties of the composition, and do not affect the behaviour of the composition once it is in contact with plants.

Drift control agents may be used to reduce spray drift of the composition, for example when the composition is sprayed onto a plant, which most often results when fine (<150 μm diameter) spray droplets are carried away from the target area by air currents. Drift control agents alter the viscoelastic properties of the spray solution, yielding a coarser spray with greater mean droplet sizes and weights, and minimizing the number of small, easily-airborne droplets. Suitable drift control agents may comprise large polymers such as polyacrylamides, polysaccharides and certain types of gums.

Suitable deposition agents (stickers) include film-forming vegetable gels, emulsifiable resins, emulsifiable mineral oils, vegetable oils, waxes, and water-soluble polymers, for example. Deposition agents may be used to reduce losses of composition from the target plant, due to the evaporation of the composition from the target surface, or beading-up and falling off of the composition. Deposition agents are particularly suitable for compositions of the invention in the form of dry (wettable) powder and granule formulations.

De-foaming and antifoam agents reduce, suppress or destroy the formation of foam in containers in which the compositions of the invention may be contained. Suitable de-foaming agents include oils, polydimethylsiloxanes and other silicones, alcohols, stearates and glycols, for example.

The adjuvant or adjuvants may comprise BREAK-THRU® S 240, BREAK-THRU® SP 131, BREAK-THRU® SP 133, BREAK-THRU® S 233, BREAK-THRU® OE 446, Aduro® and/or Transport Ultra®. BREAK-THRU® S 240 is a polyether trisiloxane that imparts super spreading and dramatically reduces surface tension. BREAK-THRU SP131 is composed of polyglycerol fatty esters and polyglycols, and it improves the performance of antifungal compounds.

BREAK-THRU® SP 133 is based on polyglycerol esters and fatty acid esters. BREAK-THRU® S 233 is a non-ionic trisiloxane surfactant, which increases the deposition of agrichemical sprays and improves the penetration of pesticide actives into plant tissue. BREAK-THRU® OE 446 is a polyether polysiloxane.

Transport Ultra® comprises a blend of non-ionic surfactants, ammoniated ions, water conditioning agents and an antifoam agent.

Aduro® comprises a monocarbamide dihydrogen sulfate and alkylamine ethoxylates.

In some preferred embodiments, at least one adjuvant is selected from a silicone, a siloxane, an alkylamine ethoxylate or a carbamide. Said adjuvants are particularly useful at enhancing the effect of the antifungal compound, or otherwise increasing or speeding up the take-up of the antifungal compound by plants (particularly vascular plants and mosses).

In some embodiments, the adjuvant may comprise: a non-ionic surfactant; and/or antifoam agent; and/or ammonium ions; and/or water-conditioning agent; and/or polyether-polymethylsiloxane-copolymer; and/or polyether polysiloxane; and/or polyglycerol fatty esters and polyglycols; and/or polyglycerol esters and fatty acid esters; and/or non-ionic trisiloxane.

In preferred embodiments, the composition comprises at least one surfactant, which may be a non-ionic surfactant. In some embodiments, the composition comprises at least one silicone or siloxane, which silicone or siloxane may act as a surfactant and/or an anti-foam agent and/or a wetting agent.

The antifungal composition may comprise one or more further antifungal agents, in addition to compound (A). Further antifungal agents may be selected from azoles; amino-derivatives; strobilurins; specific anti-oidium compounds; aniline-pyrimidines; benzimidazoles and analogues; dicarboximides; polyhalogenated fungicides; systemic acquired resistance (SAR) inducers; phenylpyrroles; acylalanines; anti-peronosporic compounds; dithiocarbamates; arylamidines; phosphorous acid and its derivatives; fungicidal copper compounds; plant-based oils (botanicals); chitosan; sulfur-based fungicides; fungicidal amides; and nitrogen heterocycles; or any combination thereof.

According to a second aspect of the invention there is provided use of a biocidal compound (A) of formula $R—S^+(R')_2$ or $R—N^+(R')_3$ wherein R is C17-C32 straight chain or branched alkyl; and each R' is independently methyl, ethyl, propyl, isopropyl or butyl;

as an antifungal, antibacterial or antiarchaeal agent.

Compound (A) may be as described and defined hereinabove for the first aspect of the invention and is preferably octadecyldimethylsulfonium or octadecyltrimethylammonium. Compound (A) may be present in an antifungal composition of the first aspect of the invention.

According to a third aspect of the invention there is provided a biocidal compound (A) of formula $R—S^+(R')_2$ or $R—N^+(R')_3$ wherein R is C17-C32 straight chain or branched alkyl; and each R' is independently methyl, ethyl, propyl, isopropyl or butyl;

for use in the treatment of a disease, preferably a fungal disease.

Compound (A) may be as described and defined hereinabove and is preferably octadecyldimethylsulfonium or octadecyltrimethylammonium. Compound (A) may be present in an antifungal composition of the first aspect of the invention.

The disease may be a plant pathogenic disease. The plant pathogenic disease may be fungal disease of a plant or its seeds, such as, for example cereals (wheat, barley, rye, oats, rice, maize, sorghum, etc.), fruit trees (apples, pears, plums, peaches, almonds, cherries, bananas, grapes, strawberries, raspberries, blackberries, etc.), citrus trees (oranges, lemons, mandarins, grapefruit, etc.), legumes (beans, peas, lentils, soybean, etc.), vegetables (spinach, lettuce, asparagus, cabbage, carrots, onions, tomatoes, potatoes, eggplants, peppers, etc.), cucurbitaceae (pumpkins, zucchini, cucumbers, melons, watermelons, etc.), oleaginous plants (sunflower, rape, peanut, castor, coconut, etc.), tobacco, coffee, tea, cocoa, sugar beet, sugar cane, cotton, and or horticultural plants.

Plant pathogenic fungi and oomycete species against which compound (A) can be used include Basidiomycetes, Ascomycetes, Deuteromycetes or imperfect fungi, Chytridiomycetes, Zygomycetes, Microsporidia and Oomycetes. Amongst these, but not exclusively, are *Puccinia* spp., *Ustilago* spp, *Tilletia* spp., *Uromyces* spp., *Phakopsora* spp., *Rhizoctonia* spp., *Erysiphe* spp., *Sphaerotheca* spp., *Podosphaera* spp., *Uncinula* spp., *Helminthosporium* spp., *Rhynchosporium* spp., *Pyrenophora* spp., *Monilinia* spp., *Sclerotinia* spp., *Septoria* spp. (*Mycosphaerella* spp., *Zymoseptoria* spp.), *Venturia* spp., *Botrytis* spp., *Alternaria* spp., *Fusarium* spp., *Cercospora* spp., *Cercosporella herpotrichoides, Colletotrichum* spp., *Pyricularia oryzae, Sclerotium* spp., *Phytophthora* spp., *Pythium* spp., Plasmopara viticola, *Peronospora* spp., *Pseudoperonospora cubensis, Bremia lactucae.*

Specific fungal species infections, against which compound (A) can be used include: *Erysiphe graminis* in cereals, *Zymoseptoria tritici* in cereals (especially wheat), *Magnaporthe oryzae* in cereals (especially rice), *Erysiphe cichoracearum* and *Sphaerotheca fuliginea* in cucurbits, *Podosphaera leucotricha* in apples, *Uncinula necator* in vines, *Venturia inaequalis* (scab) in apples, *Helminthosporium* species in cereals, *Septoria nodorum* in wheat, *Botrytis cinerea* (gray mold) in strawberries and grapes, *Cercospora arachidicola* in groundnuts, *Pseudocercosporella herpotrichoides* in wheat and barley, *Pyricularia oryzae* in rice, *Fusarium* and *Verticillium* species in various plants, and *Alternaria* species in fruit and vegetables.

Examples of plant fungal diseases against which compound (A) can be used include, but are not limited to: blotch (particularly wheat blotch), rot, *Fusarium* wilt disease, canker rot, black root rot, *Thielaviopsis* root rot, blast (particularly rice blast), cottony rot, smuts, soybean rust, cereal rust, potato blight, mildew, clubroot, anthracnose, damping-off, Rhizictonia rot, bottom rot, cavity spot, target spot, leaf blight, *septoria* spot, ring spot, black leg, stem blight, black knot, ergot, leaf blister, scab, snow mould, sooty mould and *Verticillium* wilt.

In some embodiments the disease may be an animal pathogenic fungal disease, which may, in some embodiments be independently selected from the diseases of the table below:

| Type | Mycoses | Causative organisms |
|---|---|---|
| Superficial (dermatophytoses) | Pityriasis versicolor | *Malassezia furfur* |
| | Tinea nigra | *Exophiola wemeckii* |
| | White piedra/ Black piedra | *Trichosporon beigelii/Pieddraia hortoe* |
| | Dermatophytoses (ringworm) | *Microsporum* species, *Trichophyton* species, and *Epidermophyton floccosum* |
| | Candidiasis of the skin, nails, or mucus membranes | *Candia albicans* and other *Candida* species |
| Subcutaneous | Sporotrichosis | *Sporothrix schenckii* (dimorphic) |
| | Chromoblastomycosis (dematiaceous fungi-pigment producing filamentous fungi) | *Phialophora verrucosa*, *Fonsecaea pedrosoi*, and others |
| | Mycetoma | *Pseudallescheria boydii*, *Modurella mycetomatis*, and others |
| Systemic, primary (dimorphic fungi) | Histoplasmosis | *Histoplasma capsulatum* |
| | Coccidioidomycosis | *Coccidioides immitis* |
| | Blastomycosis | *Blastomyces dermatitidis* |
| | Paracoccidioidomycosis | *Paracoccidioides brasiliensis* |
| Systemic, opportunistic | Candidiasis, systemic (yeast-like cells) | *Candida albicans* and other *Candida* species |
| | Aspergillosis (filamentous) | *Aspergillus fumigatus* and other *Aspergillus* species |
| | Cryptococcosis (yeast) | *Cryptococcus neoformans* |
| | Mucormycosis (zygomycosis) filamentous | Species of *Rhizopus*, *Absidia*, *Mucor*, and other Zygomycetes |

Thus, compound (A) can be used to treat many common human and animal fungal infections, including candidiasis, *Tinea nigra* and dermatophytoses.

According to a fourth aspect of the invention there is provided a method of destroying, controlling or suppressing fungus by contacting the fungus with a compound (A) of formula R—$S^+(R')_2$ or R—$N^+(R')_3$ wherein, R is C17-C32 straight chain or branched alkyl; and each R' is independently methyl, ethyl, propyl, isopropyl or butyl.

Compound (A) may be as described and defined hereinabove and is preferably octadecyldimethylsulfonium or octadecyltrimethylammonium. Compound (A) may be present in an antifungal composition of the first aspect of the invention.

The method may comprise contacting the fungus with an antifungal composition of the first aspect of the invention Controlling or suppressing fungus may comprise controlling the growth and/or lifespan of the fungus.

The method may comprise destroying, controlling or suppressing fungus infecting plants (including cut or growing plants or plant parts), seeds, animals (including humans, non-human mammals and other non-human animals), soil or an ecosystem.

When applying compound (A) or a composition thereof to soil or an ecosystem ground, the application rates may be from 0.02 to 3 kg or more of active ingredient per hectare, depending on the type of effect desired.

The plant may be a vascular plant, and in some embodiments is selected from a crop plant or a tree. Compound (A) or the composition comprising compound (A) may be applied by spraying or dusting the plants with the active ingredients or treating the seeds of the plants with the active ingredients. They may be applied before or after infection of the plants or seeds by the fungus or fungi.

In other embodiments the method may comprise destroying, controlling or suppressing fungus in a building material or construction material. The building material or construction material may comprise, timber (raw or treated), a wall covering, bricks, blocks, plasterboard, a floor covering or paint.

Suitable wall coverings include cladding, wallpaper, ceramic wall coverings (such as tiles), rubber, polymeric coatings, paint, varnish and lacquer, for example.

Floor coverings include carpet, linoleum, wooden boards or blocks, ceramic tiles, varnish and lacquer, for example. Compound (A) or the composition comprising compound (A) may be applied to the wall covering or floor covering by spraying or dusting the covering, or by impregnating the covering with compound (A) or a composition containing compound (A).

Compositions containing compound (A), such as solutions, emulsions, suspensions, powders, dusts, pastes and granules, may be applied to the building or construction material by spraying, atomizing, dusting, scattering, dressing or watering, for example.

According to a fifth aspect of the invention there is provided a building or construction material or composition, comprising a compound (A) of formula R—$S^+(R')_2$ or R—$N^+(R')_3$ wherein R is C17-C32 straight chain or branched alkyl; and each R' is independently methyl or ethyl.

Compound (A) may be impregnated within the building or construction material or composition, or may comprise a coating thereon, for example. The building or construction material may be selected from timber (raw or treated), a wall covering, bricks, plasterboard, a floor covering or paint.

The building or construction material or composition may be a material or composition which has been treated (such as sprayed, coated or impregnated) by the method of the fourth aspect of the invention.

According to a sixth aspect of the invention there is provided a pharmaceutical composition comprising an antifungal compound (A) of formula R—S+$(R')_2$ or R-N+$(R')_3$ wherein R is C17-C32 straight chain or branched alkyl; and each R' is independently methyl, ethyl, propyl, isopropyl or butyl;

and a pharmaceutically acceptable carrier or excipient.

Compound (A) may be as described and defined hereinabove for the first aspect of the invention, and in preferred embodiments is octadecyldimethylsulfonium ("C18-DMS+") or octadecyltrimethylammonium (C18-TPP+).

The pharmaceutical compositions of the second aspect of the invention may be used to treat humans or non-human animals, especially non-human mammals. Suitable non-human mammals include sheep, goats, cows, pigs, dogs, cats and horses, for example. Other animals may include chicken, geese, ducks, turkeys or other birds, for example.

The pharmaceutically acceptable carrier or excipient may be a solvent, and is preferably an aqueous solvent. In some embodiments the aqueous solvent may be water. In other embodiments the aqueous solvent may comprise a mixture of water and a co-solvent. The co-solvent may be an alcohol and may be selected from methanol, ethanol and a combination.

The pharmaceutical composition may be in a topical administration format. The pharmaceutical composition may thus be a topically administrable pharmaceutical composition.

The term "topical administration" relates to the application of a substance to a body surface, such as skin. In preferred embodiments, the topical administration is epicutaneous (directly onto the surface of the skin), otherwise known as "dermal administration".

The pharmaceutical composition may be provided in any suitable form for topical administration, including, but not limited to, ointments, gels, creams, lotions, foams, sprays, mousses, patches, powders, pastes, hydrogels, emulsions (including oil-in-water, water-in-oil, oil-in-water-in-oil, water-in-oil-in-water emulsions) or any combination thereof. In some preferred embodiments, the pharmaceutical composition is provided as a cream, ointment, lotion or gel, most preferably a cream or ointment.

In some embodiments the carrier or diluent may be an aqueous carrier or diluent, which may comprise water per se, such as de-ionised water, for example, or a mixture of water and another solvent. Suitable mixtures include water and polar protic solvent (such as methanol, ethanol, propanol, isopropanol and butanol) for example.

The carrier or diluent may alternatively comprise a hydrophobic carrier or diluent, which may be selected from an oil or fat, a natural wax, a petroleum wax, a hydrocarbon, or any suitable mixture thereof. Alternatively, the carrier or diluent may comprise an organic solvent.

Suitable natural waxes include beeswax (including white or yellow beeswax), a carnauba wax, a wool wax, a lanolin (such as purified lanolin or anhydrous lanolin) or any suitable combination thereof.

Suitable petroleum waxes include hard paraffin and microcrystalline wax.

Suitable hydrocarbons include liquid paraffin, soft paraffin (including white or yellow soft paraffin), white petrolatum, yellow petrolatum or any suitable combination thereof.

The pharmaceutical composition may comprise any other suitable carrier or diluent, such as those described in the British Pharmacopoeia, 2017 Edition or the European Pharmacopoeia, $9^{th}$ Edition.

Suitable organic solvents include, but are not limited to, non-polar solvents, polar aprotic solvents and polar protic solvents.

Suitable non-polar solvents include alkanes (such as hexane and pentane), cycloalkanes (such as cyclopentane and cyclohexane), benzene, toluene, chloroform, diethylether and dichloromethane.

Suitable polar aprotic solvents include tetrahydrofuran, ethyl acetate, acetone, dimethylformamide, acetonitrile, dimethyl sulfoxide and propylene carbonate.

Polar protic solvents include, but are not limited to, alcohols (such as methanol, ethanol, propanol, isopropanol and butanol, for example), formic acid and acetic acid.

Using an organic solvent, as defined above is particularly useful for pharmaceutical compositions in the form of sprays, for example. Sprays may be used to ensure hard to reach areas of skin are coated with the pharmaceutical compositions, e.g. between hooves or under skin folds.

In some embodiments compound (A) may be encapsulated. In some embodiments compound (A) may be incorporated into liposomes. For both encapsulated compound (A) and liposome-trapped compound (A) the pharmaceutical compositions of the invention may comprise an aqueous carrier, including water per se. Compound (A) may be microencapsulated. Suitable encapsulants for encapsulation or micro-encapsulation include yeast cells, exine shell materials (such as from pollen grains) and the like, for example.

The pharmaceutical composition of the invention may further comprise one or more pharmaceutical excipients. Suitable pharmaceutical excipients include, but are not limited to, emulsifiers, surfactants, solvents, co-solvents, preservatives, stabilisers, buffers, solubilizers, dispersal agents, anti-oxidants, thickeners, softeners, lubricants, emollients, and one or more further skin healing or conditioning agents.

The pharmaceutical composition of the invention may further comprise one or more pharmaceutical excipients. Suitable pharmaceutical excipients include, but are not limited to, emulsifiers, surfactants, solvents, co-solvents, preservatives, stabilisers, buffers, solubilizers, dispersal agents, anti-oxidants, thickeners, softeners, lubricants, emollients, and one or more further skin healing or conditioning agents.

Suitable preservatives include one or more selected from the list comprising: a quaternary ammonium compound such as e.g. benzalkonium chloride (N-benzyl-N-(C8-C18-alkyl)-N,N-dimethylammonium chloride), benzoxonium chloride, benzethonium chloride, cetrimide (hexadecyl-trimethylammonium bromide), sepazonium chloride, cetylpyridinium chloride, domiphen bromide or the like; quaternized ammonium cyclodextrin compounds (QACD compounds as described, for instance, in U.S. Pat. No. 3,453,257 or 5,241,059); alkyl-mercury salts of thiosalicyclic acid, such as e.g. thiomersal, phenylmercuric nitrate, phenylmercuric acetate or phenylmercuric borate; parabens, such as e.g. methylparaben or propylparaben; alcohols, such as e.g. chlorobutanol, benzyl alcohol or phenyl ethyl alcohol; biguanide derivatives, such as e.g. chlorohexidine or polyhexamethylene biguanide; sodium perborate; imidazolidinyl urea; sorbic acid; stabilized oxychloro complexes; polyglycol-polyamine condensation resins; stabilized hydrogen peroxide generated from a source of hydrogen peroxide for providing an effective trace amount of resultant hydrogen peroxide, e.g. sodium perborate tetrahydrate; and/or any suitable combination thereof.

Preferred preservatives are quaternary ammonium compounds, in particular benzalkonium chloride, cetrimide and phenyl ethyl alcohol. Where appropriate, a sufficient amount of preservative is added to the pharmaceutical composition to ensure protection against secondary contaminations during use.

Suitable surfactants or emulsifiers include, but are not limited to, non-ionic surfactants, anionic surfactants, cationic surfactants, amphoteric surfactants and zwitterionic surfactants.

Suitable cationic surfactants include quaternary ammonium salts, for example. Suitable anionic surfactants include carboxylates, such as sodium or potassium salts of a fatty acid; and sulfates of fatty acids salts, such as sodium laureth sulfate and sodium dodecyl sulfate, for example.

Suitable non-ionic surfactants include, but are not limited to ethers of fatty alcohols, polyol esters, polyoxyethylene esters, poloxamers or the like. Suitable polyoxyethylene esters include, but are not limited to polyethylene glycol (PEG). Suitable polyol esters include, but are not limited to glycol and glycerol esters, and sorbitan derivatives.

It will be appreciated that the pharmaceutical compositions of the invention for topical application should not contain ingredients that may cause irritation to the skin, even on prolonged use. Compounds to which sensitization may occur should be avoided. Thus, balanced amphoteric surfactants may be preferred as the surfactant.

The term "amphoteric surfactant" is well known to those skilled in the art. Such surfactants (which may also be known as ampholytic surfactants) possess at least one anionic group and at least one cationic group, and can therefore have anionic, non-ionic or cationic properties depending on the pH. If the isoelectric point of the molecule occurs at pH 7, the molecule is said to be balanced. Amphoteric surfactants may have detergent and disinfectant properties. Balanced amphoteric surfactants may be particularly non-irritant to the skin and therefore preferred in topical pharmaceutical compositions of the invention.

Suitable amphoteric surfactants include aminocarboxylic acids, aminopropionic acid derivatives, imidazoline derivatives, dodicin, pendecamaine or long-chain betaines, or cocamidopropyl betaines.

Suitable complexing agents include, but are not limited to those selected from: disodium-ethylenediamine tetraacetate, ethylenediamine tetraacetic acid (EDTA); chelating agents having phosphonic acid or phosphonate groups, preferably organophosphonates, particularly amino tri(lower alkylene phosphonic acids) or the like; cyclodextrins, e.g. α-, β- or γ-cyclodextrin, e.g. alkylated, hydroxyalkylated, carboxyalkylated or alkyloxycarbonyl-alkylated derivatives, or mono- or diglycosyl-α-, β- or γ-cyclodextrin, mono- or dimaltosyl-α-, β- or γ-cyclodextrin or panosyl-cyclodextrin and any suitable mixture thereof.

The pharmaceutical compositions of the present invention may further comprise antioxidants such as ascorbic acid, acetylcysteine, cysteine, sodium hydrogen sulfite, butylated hydroxyanisole, butylated hydroxytoluene or natural or synthetic Vitamin E derivatives, such as alpha-tocopherol or alpha-tocopherol acetate, for example.

In yet another embodiment, a pharmaceutical composition comprising compound (A) described herein may also comprise a second agent (second active ingredient, second active agent) that possesses a desired therapeutic or prophylactic activity other than that of the antifungal compound (A). Such a second active agent may include, but is not limited to, a further antifungal agent, an antibiotic, an antibody, an antiviral agent, an anticancer agent, an analgesic (e.g., a nonsteroidal anti-inflammatory drug (NSAID), acetaminophen, an opioid, a COX-2 inhibitor), an immunostimulatory agent (e.g., a cytokine), a hormone (natural or synthetic), a central nervous system (CNS) stimulant, an antiemetic agent, an anti-histamine, an erythropoietin, a complement stimulating agent, a sedative, a muscle relaxant agent, an anaesthetic agent, an anticonvulsive agent, an antidepressant, an antipsychotic agent, and combinations thereof.

According to a seventh aspect of the invention there is provided compound (A) for use in the treatment of a human or mammalian fungal condition. Compound (A) may be in a pharmaceutical composition as described hereinabove for the sixth aspect of the invention. The human or mammalian fungal condition may be as described hereinabove.

DETAILED DESCRIPTION OF THE INVENTION

In order that the invention may be more clearly understood, embodiments thereof will now be described, by way of example only, with reference to the accompanying drawings of which:

FIG. 1 is a table (Table 1) illustrating the relative efficacies of C12-G+, C18-TMA+ and C18-DMS+ in relation to antifungal activity and toxicity for two fungal infections of plants (*Z. tritici* on wheat and *M. oryzae* on rice);

FIG. 2 comprise 4 graphs showing the inhibitory effect of the SACCs C18-TMA+ and C18-DMS+ on the mitochondrial potential in two plant pathogenic and two human pathogenic fungi.

FIG. 3 comprises 3 graphs summarizing the results from LIVE/DEAD staining experiments that were used to assess the mortality of C18-TMA+ and C18-DMS+ in one plant pathogenic fungus, causing *Septoria tritici* blotch and two *Candida* species that cause infectious diseases in humans.

FIG. 8 is a table (Table 2) comparing the relative efficacies and toxicity of C12-G+ and C18-DMS+ using data from the table of FIG. 1.

Figure 2:
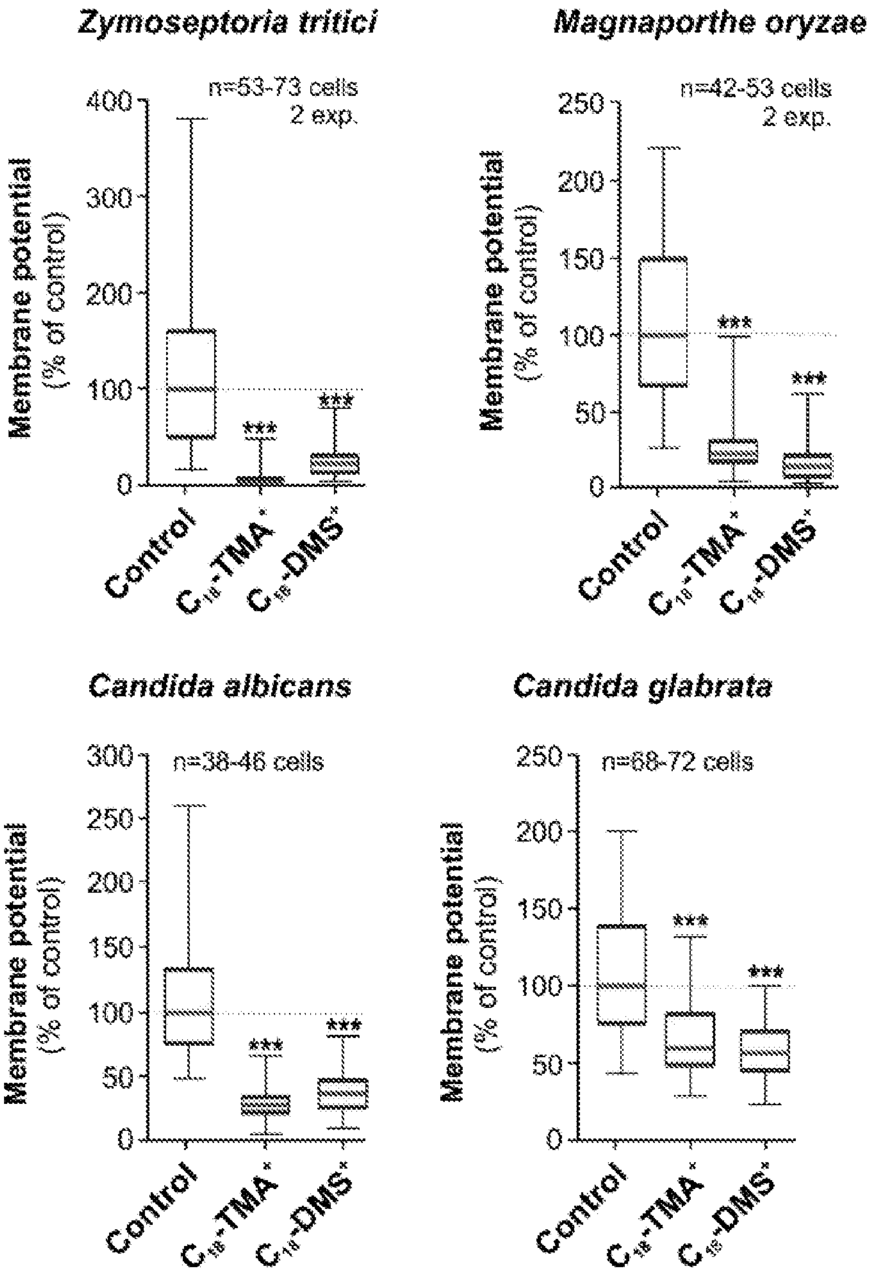

DETERMINATION OF THE EFFECT OF DODECYL-GUANIDINIUM (DODINE) ON FUNGAL PLASMA MEMBRANE INTEGRITY

The physiological effect and mode of action (hereinafter "MoA") of the known antifungal compound dodine (hereinafter "C12-G+") on the Basidiomycete corn smut fungus *U. maydis* and the Ascomycete *Septoria* wheat blotch fungus *Z. tritici*, was investigated. Both fungi are major economically important crop pathogens, for which cell biology techniques and tools, including fluorescent markers for live-cell imaging of all organelles, have been recently developed.

On agar plates, supplemented with C12-G+, fungal growth was inhibited, in a concentration dependent manner, with *Z. tritici* being ~4-times more sensitive to $C_{12}$-G+ than *U. maydis* (concentration at 50% inhibition of growth: $EC_{50}$, *Z. tritici:* 0.6 μg/ml; $EC_{50}$, *U. maydis:* 2.3 μg/ml. Next, the toxicity of C12-G+ was tested in liquid cultures of cells expressing the fluorescent plasma membrane marker GFP-Sso1, using live/dead staining. In these assays, live cells were green, but turned from yellow to red when dying. Again, C12-G+ was more effective in *Z. tritici* than in *U. maydis* and killed >80% of all cells after 1 h at 100 μg/ml (compared with ~15% killing in *U. maydis* under the same conditions). At 30-45 minutes incubation with C12-G+ at up to 50 μg/ml (*U. maydis*) or 100 μg/ml (*Z. tritici*), most cells were still alive, suggesting that investigating cells under these conditions would provide insight into the primary cellular response to the drug.

C12-G+ is thought to act on the fungal plasma membrane. Exposed cells expressing the fluorescent marker GFP-Sso1 were monitored to determine changes in appearance of the plasma membrane. High concentrations of C12-G+ induced the formation of GFP-Sso1 "patches" at the cell periphery of both fungi, but *Z. tritici* was ~2-times less sensitive to the C12-G+(at 50 μg/ml). Electron microscopy studies revealed that C12-G+-treated cells form invaginations of the plasma membrane. These structures were recognized by antibodies against GFP, indicating that they represent GFP-Sso1 patches. It is believed that plasma membrane invaginations could be a consequence of excessive insertion of C12-G+ into the fungal plasma membrane and therefore the lateral diffusion of GFP-Sso1 in C12-G+-treated cells was monitored. The reporter was photo-bleached in the plasma membrane and the recovery of fluorescence was monitored, which indicated lateral movement of unbleached GFP-Sso1. The addition of ≥10 μg/ml C12-G+ significantly reduced the mobility of GFP-Sso1 in the *U. maydis*, however, this effect was not observed in C12-G+-treated *Z. tritici* cells, suggesting differences in the impact of the SACC on the plasma membrane of the two fungi.

Drug-induced leakage of ions from the cell was then determined by visualizing alterations of the membrane potential in C12-G+-treated cells, using the voltage-sensitive fluorescent probe bis-(1,3-dibutylbarbituric acid) trimethine oxonol, DiBAC4(3), which only stains depolarised cells. High concentrations of C12-G+ increased the number of depolarised cells in *U. maydis*, but had only little effect in *Z. tritici*. This result confirms that C12-G+ had a stronger impact on the plasma in *U. maydis* than in *Z. tritici*. However, the low effect of C12-G+ on the *Z. tritici* plasma membrane does not correspond with its toxicity in this fungus (see above). Therefore, the effect on the plasma membrane is most likely not the primary MoA of C12-G+ in fungi.

Determination of the Effect of C12-G+ on Fungal Mitochondrial Organisation and Respiration The lipophilic cation C12-G+ was tested to determine whether it targeted to the negatively charged fungal mitochondria. Accumulation of lipophilic cations in the inner membrane induces alterations in the ultrastructure of mitochondria. The effect of C12-G+ was tested using fungal strains that contained a fluorescent marker (fluorescent reporter proteins) for mitochondria. Low concentrations of C12-G+ severely affected the shape of the mitochondria and induced fragmentation of the organelles. Electron microscopy revealed that the organisation of the inner mitochondrial membrane was altered, with disorganised and swollen cristae. This result supports the notion that C12-G+ targets mitochondria and inserts into the inner membrane. This membrane contains the protein complexes of the respiration chain, which generates a membrane potential, required to synthesize ATP. It was also determined whether C12-G+ interferes with this oxidative phosphorylation by staining C12-G+-treated cells with the mitochondrial potential dye tetramethylrhodamine methyl ester (TMRM) and it was found that even low amounts of C12-G+ depolarised mitochondria in *U. maydis*. Measurement of cellular oxygen consumption in cell suspensions confirmed that C12-G+ inhibits cellular respiration. A similar effect on membrane potential was observed in *Z. tritici*, and *Z. tritici* was ~4-times more sensitive to C12-G+-treatment than *U. maydis*. This corresponds well to the ~4-times increased mortality of *Z. tritici* cells in the presence of C12-G+(see above). Therefore, it is likely that an inhibitory effect on ATP-production is the primary MoA of C12-G+ in fungi.

The effects on mitochondria may account for the fungal specificity of C12-G+. To test this, mammalian skin C109 fibroblasts were treated with C12-G+ and monitored for its effect on mitochondrial shape and membrane potential.

C12-G+ had little effect on mitochondrial organization at concentrations up to 20 μg/ml, but beyond this concentration caused organelle fragmentation and swollen cristae. This suggests that C12-G+ inserts into the human mitochondrial inner membrane, yet at ~5-times higher concentration than in *Z. tritici* (as shown in Table 1 of FIG. 1; compare EC50 values for fragmentation of mitochondria). We also found a modest effect of C12-G+ on the mitochondrial membrane potential—human cells were ~50 times less sensitive to the lipid cation (as shown in Table 1 of FIG. 1; compare EC50 values for depolarisation in Table 1). Thus, the inhibitory effect on mitochondrial respiration most likely underpins the specificity of C12-G+ for fungi.

Determination of the Effect of a Longer Alkyl Chain on Antifungal Activity

Having established assays that monitor quantitatively the effect of C12-G+ on mitochondria, the synthesis and identification of novel single alkyl chain cations (hereinafter "SACCs") was performed. It has been reported that the cationic head group and the length of the alkyl chain determine the activity of SACCs. Thus, SACCs were synthesized that combined different cationic (and one anionic) moieties, including a sulfonium head group, with various length alkyl chains and their effect was tested on *Z. tritici* mitochondria. As an indicator for insertion into mitochondrial membranes, the degree of fragmentation was monitored and the depolarisation of mitochondria was measured using TMRM staining.

The following compounds were synthesized:

(i) C12-alkyl cations with various moieties:
 (dodecyltriphenylphosphonium—hereinafter "C12-TPP+";
 dodecyltrimethylammonium—hereinafter "C12-TMA+";
 dodecyltriethylammonium=C12-TEA+;
 dodecyldimethylsulfonium—hereinafter "C12-DMS+"),
(ii) lipophilic cations with short C6-alkyl chains:
 (hexyltrimethylammonium—hereinafter "C6-TMA";
 hexyldimethylsulfonium—hereinafter "C6-DMS+") and
(iii) lipophilic cations with longer C18-alkyl chains:
 (octadecyltrimethylammonium—hereinafter "C18-TMA+";
 octadecyldimethylsulfonium—hereinafter "C18-DMS+";
(iv) lipophilic alkyl anions:
 dodecyl phosphate—hereinafter "C12-PO4−")
(v) symmetric lipophilic cation with dimethylsulfonium moieties at each end of a C12-alkyl chain:
 (dodecane-1,12-diylbis(dimethylsulfonium—hereinafter "++(DMS)2-C12")

At low concentration (2.5 μg/ml) only molecules in group (i) and group (iii) induced significant mitochondrial fragmentation.

The EC50 on *Z. tritici* for each compound of group (i) and (iii) was tested, to yield the following results:

EC50 [C12-G+]: 6.63 μg/ml; EC50 [C12-TPP+]: 6.63 μg/ml; EC50 [C12-TMA+]: 3.85 μg/ml; EC50 [C12-TEA+]: 2.38 μg/ml; EC50 [C12-DMS+]: 7.39 μg/ml; EC50 [C18-TMA+]: 1.55 μg/ml; EC50 [C18-DMS+]: 1.72 μg/ml).

The results indicate that only cationic amphipathic molecules with long alkyl chains insert into the mitochondrial membrane. However, when tested for mitochondrial depolarisation, only C12-TPP+ and the two C18-alkyl chain cations (C18-TMA+, C18-DMS+) showed significant inhibition of mitochondrial respiration in *Z. tritici*. All three SACCs were tested for their ability to depolarise mitochondria in the plant pathogenic fungi *Zymoseptoria triciti* (causing *Septoria* wheat blotch) and *Magnaporthe oryzae* (causing rice blast disease). In addition, C18-TMA+, C18-DMS+ were tested for a similar effect on mitochondrial potential in *Candida albicans* and *Candida glabrata* (both causing various infectious candidiasis). All compounds reduce the mitochondrial potential (FIG. 2), required for synthesis of ATP (the major function of mitochondria). This supports conclusion that inhibition of respiration is the primary physiological effect of SACCs. Consistent with the interference with this essential cellular pathway, C18-TMA+, C18-DMS+ efficiently killed *Z. tritici* (12-14 h exposure, 10 µg/ml) and the both *Candida* species (FIG. 3; results from LIVE/DEAD staining experiments), with C18-DMS+ being most toxic in *C. albicans* (5 h exposure, 100 µg/ml). Both C18-TMA+ and C18-DMS+ were 2-7-times more toxic to *Z. tritici* than the C12-G+.

As a result of these experiments, only certain C12 and both C18 SACCs were used for subsequent testing, as it was clear C6 SACCs and some of the C12 SACCs were not suitable as effective antifungal agents.

Determination of the Toxicity of C18-TMA+ and C18-DMS+ in Human Cells and *Daphnia magna*

Low toxicity to humans and in the environment is an important requirement for fungicides. The toxicity of C12-TPP+, C18-TMA+ and C18-DMS+ was therefore tested on C109 human skin fibroblasts. Mitochondrial organization and mitochondrial membrane potential were monitored after incubating with various concentrations of the compounds. These experiments revealed that C12-TPP+ has little effect on human mitochondrial organization (EC [C12-TPP+]: 5.62 µg/ml), but affected human mitochondrial respiration at low concentration (EC50 C12-TPP+: 0.355 µg/ml) and was therefore deemed too toxic as an effective antifungal agent for most applications.

Figure 3:
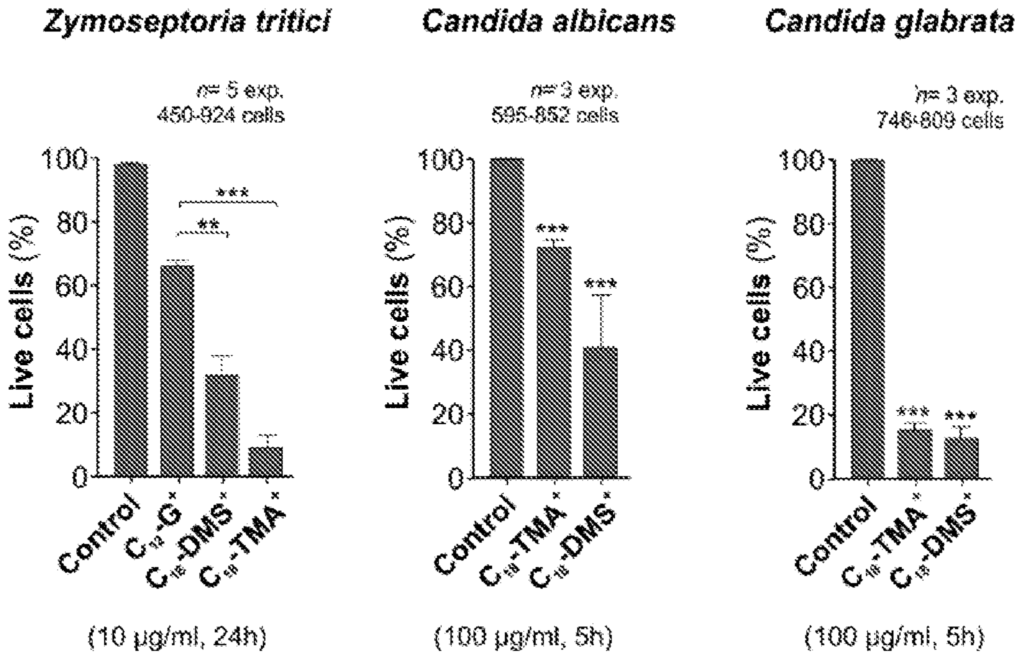

In contrast, the C18-alkyl chain cations C18-TMA+ and C18-DMS+ induced changes in mitochondrial morphology in fungi at 1.5-1.8 µg/ml, whereas human mitochondria were ~29-times less sensitive to both SACCs compared to C12-G+(as shown in Table 1 of FIG. 1). Moreover, both compounds inhibited mitochondrial respiration in *Z. tritici* at much lower concentration than in human cells, which indicated ~75-times (C18-TMA+) and ~53-times (C18-DMS+) higher specificity of both SACCs for fungi than for humans (as shown in Table 1 of FIG. 1). A similar inhibition of the mitochondrial respiration was found in the human pathogens *Candida albicans* and *Candida glabrata* (FIG. 2).

In addition, the toxicity of C12-G+, C18-TMA+ and C18-DMS+ on the water flea *Daphnia magna* was investigated. This freshwater crustacean is well-established as a reporter organism in toxicity tests. Firstly, *Daphnia magna* was treated with 1 µg/ml of C12-G+, C18-TMA+ and C18-DMS+ for 30 minutes, followed by visualization of the mitochondrial potential by TMRM. This treatment did not affect the motility of the crustaceans. Water fleas incubated with a solvent control (with no SACC) showed red-fluorescence, suggesting that their mitochondria were healthy. C12-G+-treated organisms lost most signal, indicating that even low amounts of C12-G+ rapidly affect mitochondrial respiration in *Daphnia magna*. In contrast, both C18-alkyl chain cations had little or no effect on mitochondrial potential.

Next, water fleas were treated for 24 h with various concentrations of all three SACCs and their motility behaviour and "escape response" monitored as an indicator of mortality. In these experiments, C12-G+ killed all *Daphnia magna* at ~1 µg/ml, while C18-TMA+ and C18-DMS+ had little effect at this concentration. Higher amounts of both C18 SACCs eventually killed *Daphnia magna*, with C18-TMA+ being 1.8-times more toxic than C18-DMS+. However, both C18-alkyl cations were ~5-8-times less toxic than C12-G+(as shown in Table 1 of FIG. 1).

In summary, the toxicity experiments showed that C18-TMA+ and C18-DMS+ show low toxicity to human culture cells and to freshwater zooplankton, especially compared to C12-G+ and C12-TPP+.

Figure 4:
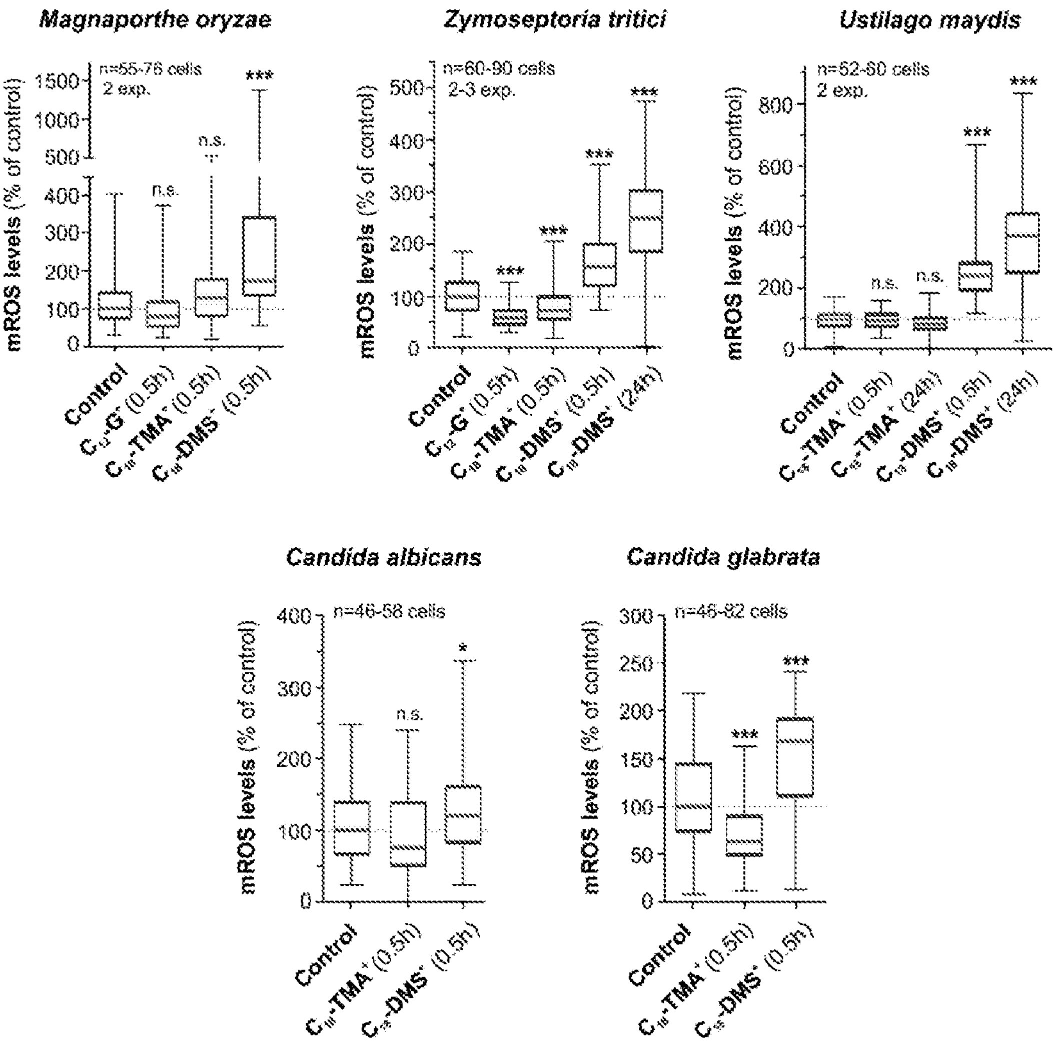
FIG. 4 is a graph illustrating the additional mode of action (mitochondrial reactive oxygen species generation) of C18-DMS+ in three plant pathogenic fungi, causing rice blast disease (*Magnaporthe oryzae*), *Septoria* blotch in wheat (*Zymoseptoria tritici*) and corn smut disease (*Ustilago maydis*); and two *Candida* species that cause infectious diseases in humans.

Determination of Whether C18 SACCs Inhibit the Mitochondrial Respiration Chain in Multiple Ways The results of the experiments hereinabove demonstrated that C12-G+, C18-TMA+ and C18-DMS+ depolarise the mitochondrial inner membrane in plant and human pathogenic fungi. In mammalian cells, the lipophilic cation C12-TPP+ exerts such effect by acting as a protonophore. We set out to test if C12-G+, C18-TMA+ and C18-DMS+ have a similar mechanism of action in *Z. tritici*. Protonophores increase the formation of mitochondrial reactive oxygen species (mROS), which can be detected in living cells using the fluorescent dye dihydrorhodamine-123 (DHR-123). *Z. tritici* cells were treated for 30 minutes with the protonophore carbonyl cyanide m-chlorophenyl hydrazone (CCCP) which confirmed an increase in mitochondrial reactive oxygen species (hereinafter "mROS") levels. mROS levels in cells treated with C12-G+ and C18-TMA+ were then measured. In contrast to CCCP, both compounds decreased mROS concentrations, suggesting that they act differently from CCCP (FIG. 4, *Zymoseptoria tritici*). Thus, a protonophore activity may be unique in C12-TPP+.

C12-G+ and C18-TMA+ significantly reduced mROS in *Z. tritici* cells (FIG. 4). A similar reduction of mROS was found for C18-TMA+-treated cells of the human pathogenic fungus *C. glabrata* (FIG. 4). The major site of mROS formation in mitochondria is respiration complex I and, to a minor extent, respiration complex III. The specific complex I inhibitor rotenone and antimycin A was used to block the activity of complex I and III, respectively. Blocking complex I decreased mROS levels and was 3-4-times more effective than C12-G+ and C18-TMA+. Thus, both SACCs inhibit complex I, but not as tightly as rotenone. The inhibitor antimycin A blocks the binding of reduced coenzyme Q at complex III and thus increases mROS in mammalian cells. An increase of mROS in antimycin A-treated *Z. tritici* cells occurred. This was significantly reduced in the presence of C12-G+ and C18-TMA+. Thus, in *Z. tritici* both SACCs appear to reduce delivery of electrons via coenzyme Q. This supports the notion that SACCs can interfere with early steps in electron transfer in the inner mitochondrial membrane.

Determination of Whether C18-DMS+ Induces mROS Production and Programmed Fungal Cell Death mROS production in C18-DMS+-treated cells was also determined in the plant pathogenic fungi *Z. tritici, U. maydis* and *M. oryzae*, and the human pathogens *C. albicans* and *C. glabrata*. Surprisingly, C18-DMS+ acted differently to C12-G+ and C18-TMA+; as mROS levels were significantly induced by this compound in all fungi tested, as shown in FIG. 4. While in *Z. tritici* this effect mimicked that of CCCP, 24 h incubation with CCCP reduced mROS, whereas 24 h treatment with C18-DMS+ induced mROS production further. When *Z. tritici* cells were incubated with the complex I inhibitor rotenone, C18-DMS+ did not increase mROS levels. Thus, it is likely that C18-DMS+ induces mROS production at respiration complex I. Next, the importance of the alkyl chain length in the ability of C18-DMS+ to trigger mROS formation was investigated. To this end, a C16-alkyl chain dimethylsulfionium cation (C16-DMS+) was also synthesized. This compound and C12-DMS+(see above) were both tested for their ability to induce mROS production in *Z. tritici*. 30 minutes incubation with both SACCs did not increase mROS levels, either at 5 µg/ml, nor at 20 µg/ml.

Thus, greater than C16-alkyl chain length appears to be required to enable alkyl-DMS+ compounds to induce mROS.

Figure 5:
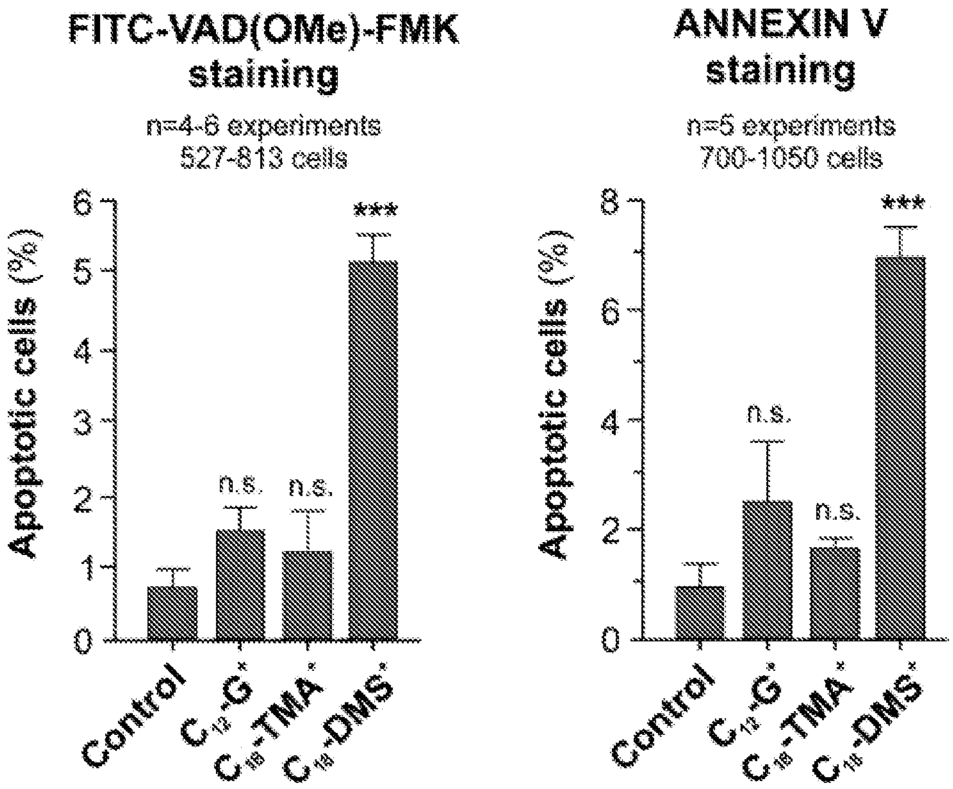
FIG. 5 is a graph illustrating the additional mode of action (induction of programmed cell death, shown by two staining methods in *Zymoseptoria tritici*) of C18-DMS+.

Increasing evidence suggests that fungi can undergo programmed cell death, and mROS are thought to induce this pathway. Thus, programmed cell death in *Z. tritici* cells treated with C12-G+, C18-TMA+ and C18-DMS+ was tested. Fluorescent caspase activity marker CaspACE™ FITC-VAD-FMK was used, which allows detection of apoptotic death in fungi. Co-staining with propidium iodide, a plasma membrane integrity reporter, was performed, to distinguish early apoptotic cells from dead post-apoptotic cells. After 24 h treatment with C18-DMS+, a significant increase in early apoptotic cells was found (CaspACE™ FITC-VAD-FMK positive but propidium iodide negative; shown in FIG. 5). Only a few apoptotic cells were found after incubation with C12-G+ or C18-TMA+. This result was confirmed using Annexin-V-fluorescein staining of exposed phosphatidylserine at the plasma membrane in early apoptotic cells. Again, membrane-associated fluorescence in apoptotic cells was only found in C18-DMS+-treated cells, as shown in FIG. 5. Thus, C18-DMS+-induced mROS production results in activation of a programmed cell death pathway in *Z. tritici*, and most likely also in other plant and human pathogens.

Determination of C18-DMS+ and C18-TMA+ Protection of Plants Against *Septoria* Wheat Blotch and Rice Blast Infections.

As determined above, C12-G+, C18-TMA+ and C18-DMS+ depolarise the mitochondrial membrane and inhibit ATP synthesis, thereby cutting off "energy supply" in the pathogen. Moreover, C18-DMS+ induces mROS production, which causes oxidative damage in the mitochondria and triggers programmed cell death. This multiple mode of action enhanced protection against plant pathogens in leaf infection assays was investigated. Wheat plants, with leaves pre-treated with all SACCs were spray-inoculated with *Z. tritici* IPO323. In addition, the ability of C12-G+, C18-TMA+ and C18-DMS+ to protect rice leaves against the rice blast fungus, *Magnaporthe oryzae* was tested. All the SACCs tested were found to suppress germination and abolish appressorium formation of *M. oryzae* germlings—these being the developmental steps crucial for subsequent rice infection. Within 3 h on glass slides, conidia treated with the solvent control germinated and formed appressoria. Indeed, three SACCs inhibited this, with C18-TMA+ being slightly more effective than C18-DMS+. This was accompanied by mitochondrial fragmentation, changes in the organization of the inner membrane and a depolarisation of the mitochondria. mROS levels were also determined in the presence of all SACCs and found that only C18-DMS+ induced mROS production. These results confirm the findings in *Z. tritici* and suggest that C18-DMS+ may have an increased potential to protect against rice blast disease. As further preparation for the plant infection experiments, it was investigated if wheat and rice leaves are sensitive to C12-G+, C18-TMA+ or C18-DMS+. Whole plants were sprayed to "leaf run off" with water containing small amounts of the solvent methanol (=negative control), 10% Tween 20 (=positive control) and 1000 μg/ml C12-G+, C18-TMA+ and C18-DMS+ in solvent/water, respectively. Despite these high concentrations, none of the SACCs induced chlorosis or necrosis in wheat or rice leaves after 7 days. This demonstrates that neither C12-G+, nor C18-TMA+ or C18-DMS+ is phytotoxic.

Figure 6:
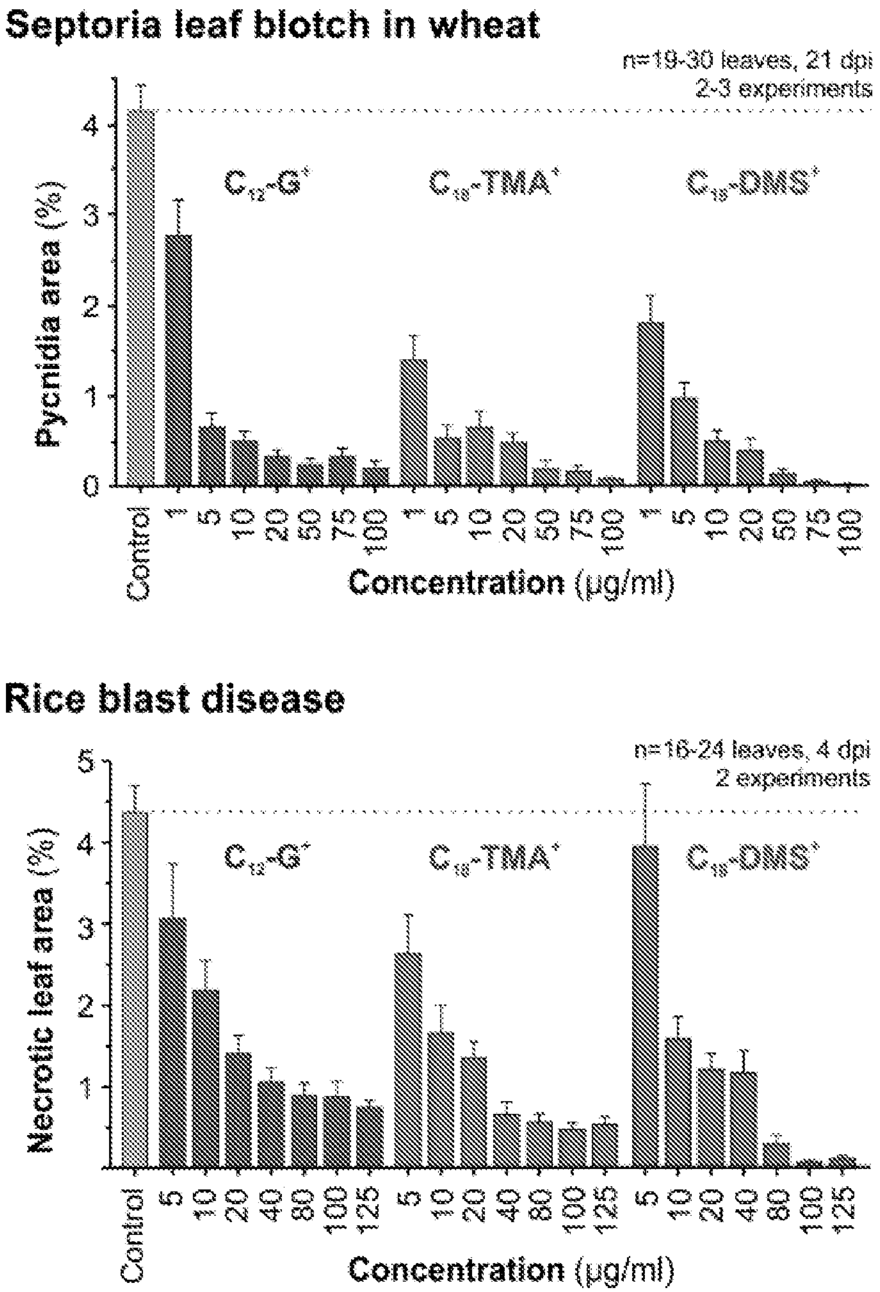
FIG. 6 is a graph illustrating the increased potential of C18-DMS+ to protect crops against *Septoria* wheat blotch and rice blast disease.

Next, quantitative wheat and rice leaf infection assays were performed. Various concentrations of all 3 SACCs were sprayed onto wheat and rice, and the plants left for 24 h before applying *Z. tritici* (strain IPO323) and *M. oryzae* (strain Guy11) and the appearance of disease lesions/symptoms was quantified. In control experiments, *Z. tritici* formed dark spots on the chlorotic leaves after 21 days, which represent melanised pycnidia that are symptomatic for *Septoria* wheat blotch disease. Infection with *M. oryzae* resulted in the formation of brown disease lesions after 4 days incubation. Symptom development was inhibited when leaves of both crops were treated with C12-G+, C18-TMA+ or C18-DMS+. This protective effect was concentration-dependent. Even at high concentrations, C12-G+ did not fully suppress infection by *Z. tritici* or *M. oryzae*, and C18-TMA+ did not protect entirely against *Septoria* wheat leave blotch and rice blast disease, as shown in FIG. 6. In contrast, C18-DMS+ almost abolished symptom developments at 75 and 100 μg/ml in wheat and rice, and is therefore particularly useful as an antifungal agent for crop protection. Indeed, a direct comparison of disease symptom formation at high concentrations revealed that C18-DMS+ protects significantly better against *Z. tritici* and *M. oryzae* (as shown in Table 1 of FIG. 1 and Table 2 of FIG. 6).

Figure 7:
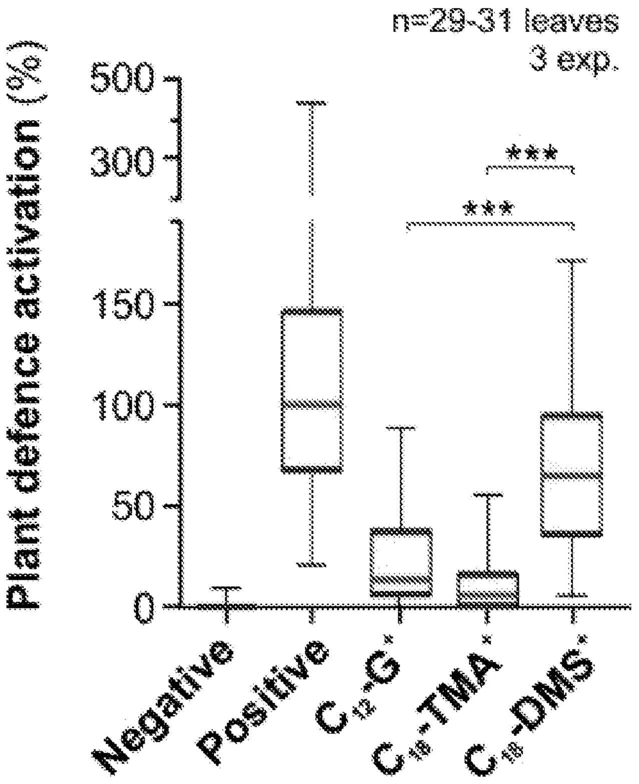
FIG. 7 is a graph illustrating an additional mode of action (induction of the plant defence system) of C18-DMS+.

The observed increase in plant protection by C18-DMS+ could be due to the multiple MoA in the fungal pathogen. However, it possible that C18-DMS+ also induces innate defence in plants, thereby alerting the plant to a potential pathogen attack. Such priming results in an oxidative burst, including the production of hydrogen peroxide, which protects the plant from pathogen invasion. The three SACCs were tested to determine if they induce such early plant defence response, by treating rice leaves with 150 μg/ml C12-G+, C18-TMA+ and C18-DMS+, followed by staining with diaminobenzidine (DAB). This dye reacts with local $H_2O_2$, resulting in a reddish-brown coloured precipitate that is indicative of a plant defence reaction. Leaves treated with the solvent showed almost no DAB precipitation, whereas treatment with 15 mM salicylic acid resulted in brown colouring. C12-G+ and C18-TMA+ treatment induces slight peroxide production after 6 h, but a much stronger DAB reaction was found when leaves were sprayed with C18-DMS+(as shown in FIG. 7 and Table 1 of FIG. 1). This suggests that C18-DMS+ primes the plant for pathogen attack, which increases the protective activity of this SACC.

Uses and Advantages of the Invention

We need new fungicides to protect our calorie crops from fungal disease and thus ensure food security and to protect human/animal and ecosystem health. The challenge is therefore to discover antifungals, which combine low human toxicity with low environmental-impact. Moreover, such chemistries must be resilient, that is have multi-site modes of action that cannot be easily overcome by the emergence of resistance. Mitochondria are valuable targets for fungicide development, as these organelles provide cellular ATP, but also control lipid homeostasis and programmed fungal cell death. A novel group of SACCs with alkyl chain length greater than 16 have been synthesized and used as antifungal agents. In particular two SACCs, C18-TMA+ and C18-DMS+, combine high antifungal activity with relatively low toxicity in humans, *Daphnia magna* and plants. C18-DMS+ in particular shows low toxicity and combats fungal pathogens by multiple pathways, namely: (i) inhibiting oxidative phosphorylation, (ii) inducing damaging mROS, (iii) triggering fungal apoptosis and (iv) priming plant defence.

Single Alkyl Chain Cations Target Fungal Mitochondria

Lipophilic cations have long been known for their antibacterial toxicity and, more recently, gained recognition as antifungal compounds in medical use. Amongst the biocidal cations are the SACCs, which combine a cationic head group with a long n-alkyl chain. This simple amphipathic organization suggests that SACCs insert into membranes. Indeed, numerous studies report that SACCs, such as CTAB (cetyltrimethylammonium bromide) or C12-G+(dodecylguanidimium, also known as dodine) alter the permeability or function of the plasma membrane. Before SACCs reach the plasma membrane, they must traverse the fungal cell wall. During this passage they can change the surface charge of the fungal cell, which has been described as the primary effect underpinning the fungitoxicity of these compounds. Thus, antifungal lipid cations, including the SACCs, are considered to act at the fungal cell surface, which is reflected by the name "cationic surfactants".

Numerous results, however, contradict this putative MoA in fungi. Early reports on the mode of action of dodine showed that, at high concentrations, this fungicide permeabilises the plasma membrane—but the fungal cells were already dead. Other reports suggested that dodine inhibits vital metabolic enzymes, suggesting that the lipophilic cation crosses the plasma membrane and exerts its primary fungitoxic effect inside the fungal cell. Once beyond the plasma membrane, the positively charged SACCs likely accumulate in the negatively charged mitochondrial matrix, where they insert into the inner mitochondrial membrane. The results detailed herein support this concept. While high concentrations of C12-G+ affect the fungal plasma membrane (EC50-20-50 μg/ml in *Z. tritici*), all SACCs tested induced mitochondrial fragmentation and altered the appearance of the inner mitochondrial membrane (EC50<7 μg/ml in *Z. tritici*). Moreover, all 7 long-chain SACCs tested showed more potent inhibition of mitochondrial respiration (EC50<2 μg/ml in *Z. tritici*). these results were confirmed in *U. maydis* and *M. oryzae*, using selected SACCs. Thus, it is believed that SACCs target mitochondria and interfere with oxidative phosphorylation in fungi.

Multiple Effects of Single Alkyl Chain Cations on Mitochondrial Respiration

Electron transfer through the mitochondrial respiration chain complexes pumps protons into the inner mitochondrial space, leaving the matrix negatively charged. This spatial charge separation generates a proton-motive force that is used to synthesise ATP. SACCs depolarise the inner membrane and thus abolish ATP production, which effectively "cuts off" the energy supply of the fungal cell. Previous work, with isolated mitochondria, showed that C12-TPP+ depolarises the mitochondria by interacting with negatively-charged fatty acid residues, and this leads to a mild uncoupling effect. Thus, the SACCs tested may promote the uncontrolled passage of protons into the mitochondrial matrix. However, monitoring mROS production in *Z. tritici* revealed that SACCs act differently from the protonophore CCCP. Moreover, the uncoupling activity of C12TPP+ requires delocalized cationic charges, while the SACCs carry localised charges. Thus, C12-TPP+ may have a unique effect on the fungal mitochondrial respiration chain, which could explain its high toxicity. However, the results cannot exclude a mild uncoupling effect of the SACCs tested.

Without being bound by any theory it is believed that lipophilic cations can inhibit respiration complex I and/or complex III in isolated mitochondria. In fungi, complex I is complemented by fungal—specific alternative dehydrogenases. Both are reducing coenzyme Q, which delivers the electrons to complex III. As a by-product, both complex I and III produce low levels of mROS. C12-G+ and C18-TMA+ reduce basal levels of mROS in *Z. tritici*, and also lower antimycin-A-induced mROS formation at complex III. Thus, SACCs may interfere with early steps in the electron transfer chain. One possibility is that membrane-inserted SACCs alter the surface charge of these membrane-bound enzymes, thereby interfering with their activity. Furthermore, SACCs could change the fluidity of the membrane and thereby interfere with the assembly and function of complex I, as this requires its diffusion through the inner membrane and was shown to be dependent upon the lipid composition of the inner membrane. Moreover, lipophilic cations may bind directly to the proteins of respiration complexes. Indeed, the specific complex I inhibitor 2-decyl-4-quinazolinyl-amine (DQA), binds directly to purified complex I and is predicted to be a lipophilic cation at physiological pH. Thus, inference with early steps in the respiration chain, either via inhibiting fungal alternative NADH dehydrogenases and/or fungal-specific proteins in complex I may account for the specificity of SACCs for fungal cells.

C18-DMS+ and C18-TMA+ Combat Fungal Pathogens by Multiple Modes of Action.

As shown in the Figures, the most effective antifungal SACC against *Z. tritici* is C18-DMS+. This compound is more fungitoxic and inhibited respiration more effectively than C12-G+(as shown in Table 2 of FIG. 8), a known fungicide used to control orchard pathogens. Importantly, the enhanced antifungal performance of C18-DMS+ was accompanied with lower toxicity to human cells and *Daphnia magna*. Whilst C18-DMS+ was less effective in inhibiting oxidative phosphorylation than the quaternary ammonium cation C18-TMA+(as shown in Table 1 of FIG. 1), it effectively protected wheat and rice against fungal pathogens significantly better than the other C12-G+ and C12-TPP+. It is likely that this improved protective performance is due to the multiple ways in which C18-DMS+ and C18-TMA+"attacks" the fungal pathogen. C18-DMS+ in particular showed fungal suppression and killing through multiple actions, namely: (i) like other SACCs, this compound inhibits oxidative phosphorylation, so depriving the fungal cell of ATP; (ii) it induces mROS production, most likely involving complex I—this causes oxidative damage to mitochondrial lipids and proteins; (iii) C18-DMS+ dispenses pathogen down an irreversible programmed cell death pathway; (iv) finally, C18-DMS+ triggers the formation of hydrogen peroxide in plants, which is indicative of the oxidative burst which triggers the early plant defence response. Thus C18-DMS+ primes the plant against pathogen attack and thus decreases the chance of successful fungal infection.

C18-TMA+ and C18-DMS+ differ only in their head group, suggesting that the additional physiological effects in fungal cells are due to the dimethylsulfonium moiety. Key to the physiological effect of C18-DMS+ in fungi is its ability to induce mROS production. This was found in *Z. tritici, M. oryzae* and *U. maydis* and thus is a general feature of C18-DMS+. Interestingly, the dimethylsulfonium moiety does not induce mROS when attached to a C12- or a C16-alkyl chain—even at high concentrations. This result demonstrates that the length of the alkyl chain is critical for the function of the cationic head group. This finding is surprising, as the even a slightly shorter hydrophobic C16-alkyl chain did not integrate effectively into the inner mitochondrial membrane, and only chain lengths longer than C16 showed mROS induction.

Conclusions

C18-DMS+ and C18-TMA+ were, surprisingly, far more effective antifungal agents than any of the C6 or C12 alkyl chain length compounds tested. Both C18-DMS+ and C18-

TMA+ were more effective, overall (and in the case of C18-DMS+, in substantially every mode of action) against the corn smut fungus *U. maydis*, the *Septoria* leaf blotch pathogen *Z. tritici* and the rice blast fungus *M. oryzae* than the other SACCs tested. Collectively, the pathogens tested challenge crops that provide two thirds of the calories in human diet. Table 1 of FIG. 1 shows the improved efficacy and lower toxicity of both C18-DMS+ and C18-TMA+ compared to the well-known SACC antifungal compound dodine, and Table 2 of FIG. 8 also shows how much more effective C18-DMS+ is compared to dodine.

Figure 9:
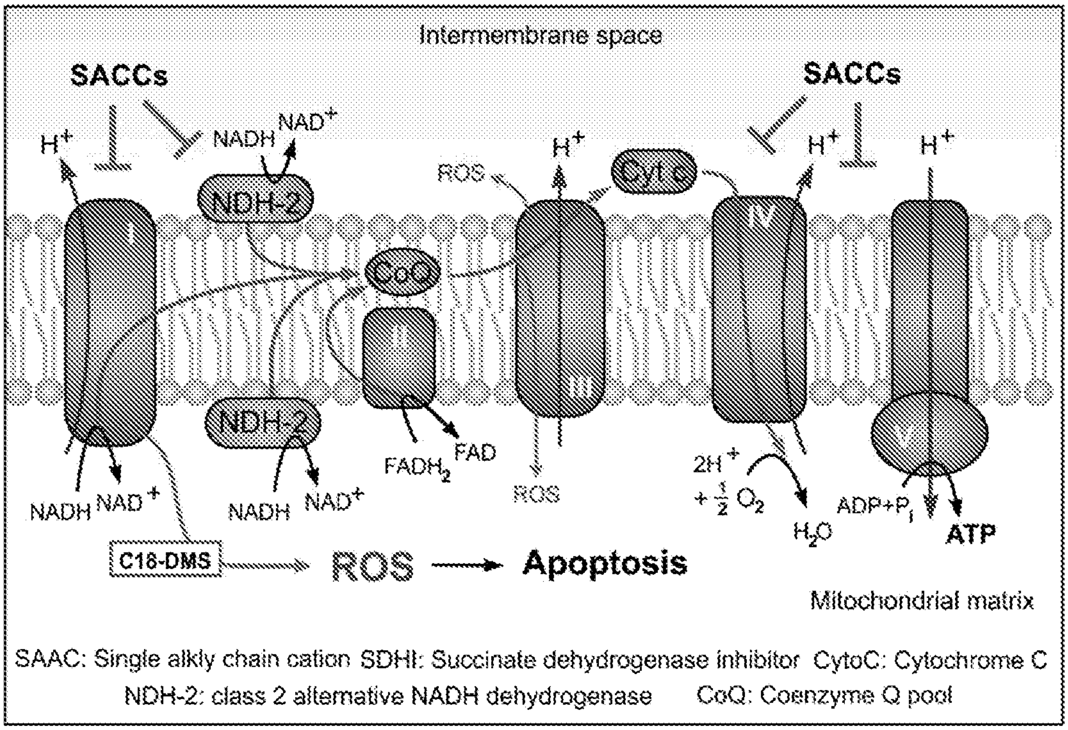
FIG. 9 illustrates a model of the effect of SACCs on fungal oxidative phosphorylation.

Secondly, both C18-DMS+ and C18-TMA+ target the fungal respiration chain in various ways, with C18-DMS+ causing mROS at respiration complex I, which is expected to damage mitochondrial proteins and lipids, but also triggers fungal apoptosis, as shown in FIG. 9.

Finally, the C18 SACCs tested showed relatively low toxicity in human culture cells and in *Daphnia magna* (compared to known SACC fungicides), with C12-TPP+ showing unexpectedly high toxicity to human culture cells; while C12-G+ did not protect plants against pathogens to a suitable degree.

The identification of C18-DMS+ and C18-TMA+, and consequently the identification of C17-C32 alkyl chain cations having dialkyl- or trialkyl-substituted cation moieties, as particularly efficacious antifungal agents, which act through a range of modes of operation and which have significantly less toxicity (human and/or environmental toxicity) than C12-G+, demonstrates that the inventive compounds and compositions of the invention hold a huge potential as fungicides in crop protection.

Other Uses

Due to their low human toxicity and efficacy against fungi, the C17-C32 SACC compositions of the invention may be used to treat (prophylactic or ameliorating) building and construction materials, in particular timber, wall coverings (such as wall paper), floor coverings (such as carpet or linoleum) and in paint. The SACC compositions may be incorporated during manufacture of the building or construction material, or may be impregnated or coated on the material after manufacture.

The SACC compositions of the invention may also be used in cleaning or sterilising compositions, both against fungi and against other microbes (e.g. oomycetes, archaea), which may be used prophylactically to prevent pathogen growth on a surface, for example, or to remove infestation from a surface.

The SACC compositions of the invention may further be used on soil or other plant growth medium, to remove fungi, limit the spread of fungi or control the growth of fungi. It may be applied in any suitable manner, such as by spraying or dusting, for example.

C18-DMS+, C18-TMA+ and other C17+ SACC compositions of the invention can be incorporated into pharmaceutical compositions, particularly for topical administration on humans, non-human mammals and other animals.

The above embodiments are described by way of example only. Many variations are possible without departing from the scope of the invention as defined in the appended claims.

The invention claimed is:

1. A method of destroying, controlling or suppressing a fungus by contacting the fungus with an antifungal compound of formula $R—S^{+}(R')_2$ wherein, R is octadecyl; and each R' is methyl, wherein the method comprises a method of plant protection, and wherein the antifungal compound, or composition comprising the antifungal compound, is applied to a plant, plant part or seed of a plant having a fungal infection.

2. A method of destroying, controlling or suppressing a fungus by contacting the fungus with an antifungal compound of formula $R—S^{+}(R')_2$ wherein, R is octadecyl; and each R' is methyl, wherein the method comprises treating a human or animal fungal infection.

* * * * *